United States Patent

[11] 3,587,349

| [72] | Inventor | Philip E. Massie |
| | | Culver City, Calif. |
| [21] | Appl. No. | 822,462 |
| [22] | Filed | May 7, 1969 |
| [45] | Patented | June 28, 1971 |

[54] AXIAL GEAR TRAIN
3 Claims, 5 Drawing Figs.

| [52] | U.S. Cl. | 74/800 |
| [51] | Int. Cl. | F16h 1/28 |
| [50] | Field of Search | 74/800, 787 |

[56] References Cited
UNITED STATES PATENTS

| 544,796 | 8/1895 | Shaw | 74/800 |
| 871,240 | 11/1907 | Schoedelin | 74/800 |
| 2,953,944 | 9/1960 | Sundt | 74/800X |
| 3,085,451 | 4/1963 | Morin | 74/800 |
| 3,159,056 | 12/1964 | Blazo | 74/800X |
| 3,385,135 | 5/1968 | Strandberg | 74/800 |

Primary Examiner—C. J. Husar
Attorney—Herzig & Walsh

ABSTRACT: The device is an axial gear train for purposes of effecting a change of speed such as a substantial reduction in speed. There is provided a fixed or nonrotatable bevel gear at the center of which is an input shaft. Axially aligned with the input shaft is an output shaft having a rotatable output bevel gear on it. The input shaft has an axial portion between the two bevel gears which is positioned at an angle, and journaled on this part of the input shaft is a double bevel gear having bevel teeth on both sides so that one side of this gear meshes with the nonrotatable gear and one side meshes with the rotatable output gear. Different relationships are possible as between the number of teeth on the fixed gear, the number of teeth on one side of the angle gear; and as between the number of teeth on the output gear and the number of teeth on the other side of the angle gear. By reason of these relationships high reductions in speed or increases in speed are possible as between the input shaft and the output shaft.

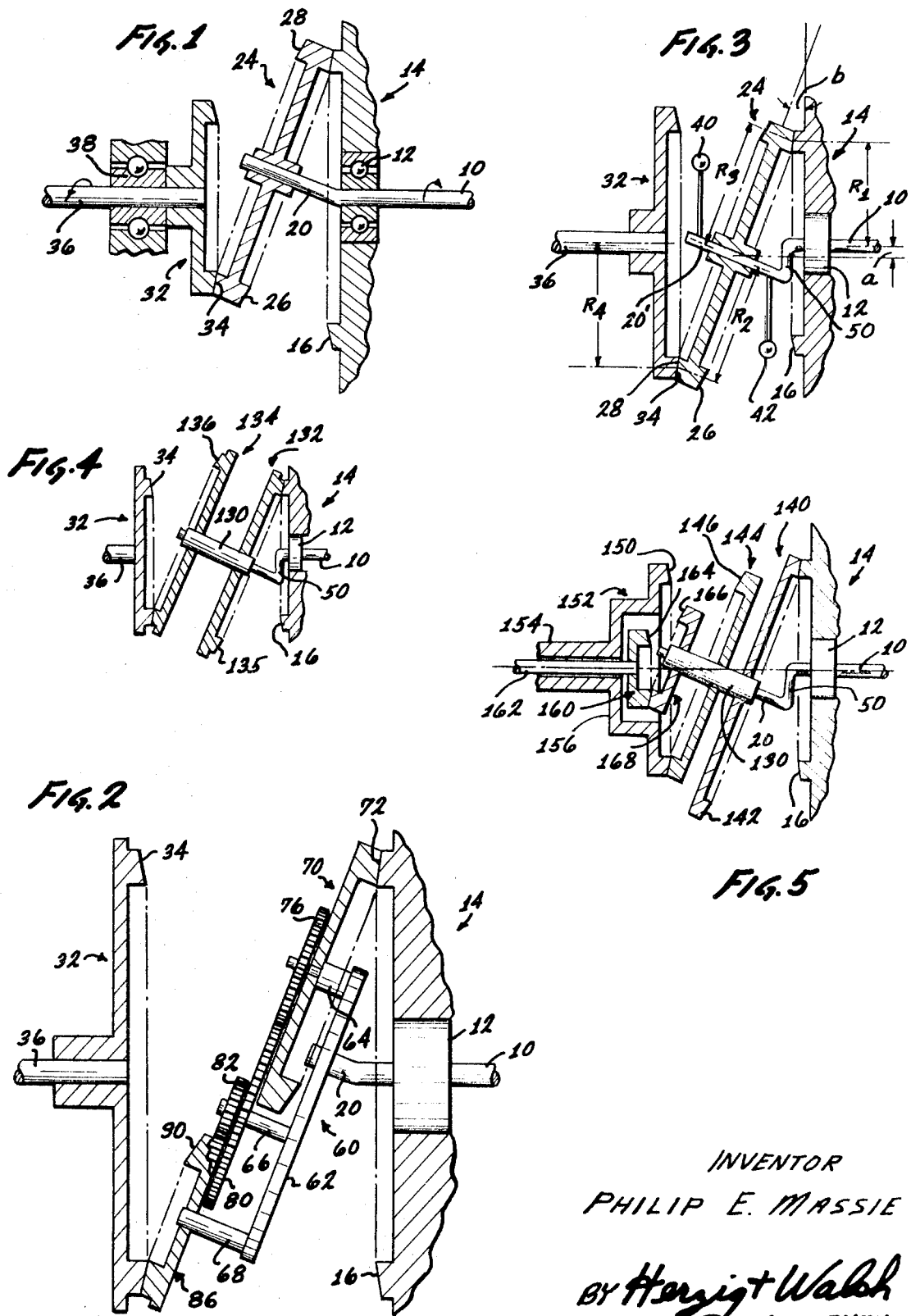

AXIAL GEAR TRAIN

SUMMARY OF THE INVENTION

The invention is a gear train for the purposes of effecting substantial speed changes, that is, gear ratios to reduce or increase speed, more particularly to effect a substantial gear reduction. A very important characteristic of the device is that it is axial, the input and output shafts being aligned. A further characteristic of the device is that only an extremely small number of gears is used, in most forms of the invention, three. The significance of the invention is readily apparent considering present day needs for a device for effecting very great speed reductions, and considering the fact that the gear train of the device is axial and utilizes only a very small number of gears. The need for speed reduction is present in many different circumstances, such as, for example, in the drive of various types of vehicles or other low rotational speed equipment from turbines which are inherently very high speed mechanisms. In these circumstances very great speed change ratios are necessary to reduce the speed of the prime mover to that of the driven device. For example, the shaft speed of the turbine may be measured in tens of thousands, whereas the shaft speed of the driven device may be in hundreds or tens. Not only is this great reduction in speed necessary, but it is, of course, highly desirable that this be accomplished without disturbing the alignment of the shafts, that is, that the shaft of the prime mover is to be aligned with the shaft of the driven device. A particular example is that of an aircraft propeller driven by a turbine engine, that is, a turboprop. It is desired that the axes of rotation be aligned and that the speed reduction unit be of minimum weight and utilize a minimum of parts. Heretofore devices accomplishing this purpose have been very complicated and heavy and subject to very extensive friction losses.

Preferred exemplary forms of the invention are described in detail hereinafter. In the preferred embodiments of the invention it takes the form of an axial gear train comprising a nonrotatable bevel gear having an input shaft journaled at its center; an axially aligned output shaft having a bevel output gear on it; and an input shaft having an angular portion between the two bevel gears on which is another bevel gear with teeth on both sides, the teeth on one side meshing with the nonrotatable bevel gear and teeth on the other side meshing with the teeth of the output bevel gear.

This configuration makes it possible to have different sizes of beveled gears, therefore, to have different numbers of teeth on them. Very high-speed stepdown and step-up ratios are then possible, depending upon relative numbers of teeth as described in detail hereinafter. By varying the relationship in relative sizes of gears it is possible to provide for rotation of the output shaft in either direction, that is, in either the same direction or in the opposite direction from the input shaft, these directions of rotation being described as positive and negative rotation of the output shaft. It also becomes very easy to provide two output shafts driven by the same gear train, one rotating in one direction and one rotating in the opposite direction, so that a driven device can be clutched to either one of these output shafts.

The primary object of the invention is to provide a gear train which is axial and which utilizes a minimum number of gears but which is capable of very great speed changes, that is, stepped up changes or stepped-down changes in speed.

It is a further object to realize the characteristic in a type of device described wherein the speed changes are realized in a single stage of change.

Another object is to realize a device of the type described wherein rotative outputs in the opposite directions can be obtained.

Another object is to realize the characteristic in the device that there is no sliding friction as in hypoid gears; that there are no flexible members or wave generators involved; and that the gear and tooth forms are standard and subject to mass production by casting, cutting, grinding or hobbing. Further objects and additional advantages of the invention will become apparent with the following detailed description and annexed drawings wherein:

FIG. 1 is a sectional view of one form of the invention;

FIG. 2 is a sectional view of a modified form of the invention;

FIG. 3 is a sectional view of another modified form of the invention;

FIG. 4 is a sectional view of a preferred form of the invention;

FIG. 5 is a sectional view of a further modified form of the invention.

Various exemplary forms or embodiments of the invention are disclosed herein. FIG. 1 shows a simplified illustrative exemplary form of the invention. In this form of the invention numeral 10 designates an input or drive shaft rotatable in the direction indicated by the arrow. The shaft 10 is journaled in the bearing 12 mounted in a member or body 14 that does not rotate. The member 14 may be simply a gear that is fixed or held so as not to rotate having beveled teeth as designated at 16.

The shaft 10 has an angular axle portion 20 beyond bearing 12. The angle between the part 20 and the axis of the part of the shaft 10 might be 25° or 30°, for example. The amount of this angle will be explained more in detail hereinafter.

Mounted on the shaft part 20, that is, journaled thereon is a double bevel gear 24 having bevel teeth 26 on one side and bevel teeth 28 on the other side. It will be observed that the gear 24 is smaller than the gear 14, the difference in sizes obviously being related to the angle of axle 20. Because of the angle in the shaft 10 the gear 24 is positioned at an angle with respect to the gear 14 such that its teeth 26 mesh with the teeth 16 on the gear 14. The angle of bevel on the teeth is not critical but is accommodated to the angle between the shaft portion 20 and the shaft 10. The teeth 28 are like the teeth 26 having a similar angle of bevel. The gears and the tooth forms on them may be standard commercially available gears subject to mass production by casting, cutting, grinding or hobbing. As will be observed, when the driven or input shaft 10 rotates thus rotating the angular part 20 the tilted position of gear 24 changes such that the point of contact between gear 24 and gear 14 rotates around the axis of shaft 10. The significance of this will be made clear presently.

Numeral 32 designates another similar gear having beveled teeth 34. This gear is on a shaft, that is, an output or driven shaft 36 rotatably journaled in a bearing 38. The shafts 10 and 36 are axially aligned and the gears 14 and 32 are spaced so that the teeth 26 on gear 24 mesh with teeth 16 of gear 14 whereas the teeth 28 of bevel gear 24 mesh with the teeth 34 of gear 32. It will be observed that gear 34 is smaller than gear 24.

As explained in the foregoing, the primary purpose of the gear train described is to provide for having speed-changing gear ratios particularly for purposes of speed reduction wherein very substantial gear ratios are realized in a very simple mechanism using a minimum number of gears.

As the shaft 10 rotates the point of contact between teeth 28 and 34 rotates around the gear 34, this point being 180° displaced from the point of contact between teeth 26 and teeth 16. The effect of the arrangement shown in FIG. 1 is to produce a substantial speed reduction. This is achieved by way of predetermined ratios as between the number of teeth on the respective gears. The effect may be illustrated as follows. By way of example, gear 14 may have 10 teeth as designated by numeral 16; gear 24 may have nine teeth as designated by numeral 26, as well as having 10 teeth as designated by numeral 28; and gear 32 may have eight teeth. Under these circumstances for one revolution of shaft 10 the first tooth or tooth number 1 of gear 14 and the first tooth or tooth number 1 of teeth 26 are in contact at the start of revolution of shaft 10. At the completion of the revolution of the shaft, the first tooth or number 1 tooth of the teeth 26 is then in contact with the ninth tooth or tooth number nine of the teeth 16. Thus, it will be observed that while the point of contact between teeth 26 and teeth 16 has moved through 360° by reason of there being one less tooth 26 it has been necessary for the gear 24 to rotate on its shaft in a direction opposite to the rotation of shaft 10 by the amount of one tooth. Thus, the ratio between shaft 10 and gear 24 is 10 to 1; in other words, for 10 revolutions of shaft 10 the gear 24 would make one revolution about its axis. It will be observed that essentially the movement imparted to the gear 24 is to move its point of contact with gear 14 circularly, not by rotating gear 24, but by tilting it.

If the number of teeth 26 were greater than the number of teeth 16, that for example, in the amount of one tooth, then the direction of rotation for gear 24 about its axis would be in the same direction of rotation of shaft 10 instead of the reverse.

Gear 24 may have the same number of teeth on both sides, that is, the number of teeth 26 may be nine and the number of teeth 28 may be nine. For purposes of example, gear 32 may be considered to have eight teeth. Now for one revolution of shaft 10 tooth No. 1 of teeth 28 mates with tooth No. 1 of teeth 34 at the start. Tooth 1 of teeth 34 mates with tooth 9 of teeth 28 at the end of one revolution, and thus, this will move the gear 32 in the opposite direction of rotation of gear 24 and in the same direction as the rotation of shaft 10 by a ratio of 1 to 9 for one revolution. Since gear 24 is rotating (or being rotated) opposite to the direction of rotation of the shaft 10, and gear 32 is rotating opposite to gear 24, the net result is a movement of gear 32 with respect to gear 14 which is the difference of the gear ratios of the two pairs of gears. Thus, it may be seen that the gears of 100 or more teeth the ratio becomes very significant.

By way of further example, the number of teeth 26 might be 101 and the number of teeth 16 might be 100. Thus, as shaft 10 rotates through one revolution each tooth 26 in turn falls into an intertooth slot between teeth 16, and at the completion of one revolution of shaft 10, 100 teeth of teeth 26 have contacted teeth 16 of gear 14, but tooth number 101 must now fall into the slot formerly occupied by tooth No. 1 of teeth 26, thus advancing gear 24 by one tooth space, that is, tooth No. 1 of teeth 26 now falls into the slot formerly occupied by tooth No. 2 of teeth 26. Gear 24 has thus advanced in rotation by an amount:

$$\frac{N(26) - N(16)}{N(16)}$$

(N refers to number of teeth.)

This rotation of gear 24 is in the same rotational direction of rotation of shaft 10 and may be referred to as positive rotation, reverse rotation from the direction of shaft 10 being identified as negative rotation.

Considering further this example, where there are 100 teeth 16 and 101 teeth 26, consider further that there are 101 teeth 28 and 100 teeth 34. Thus, as noted above, for one revolution of the shaft 10 and part 20 the gear 24 will advance by one tooth space referring to the teeth 28, gear 32 now being free to rotate, during one revolution of shaft 10, and movement of gear 24 by the amount of one tooth 28, gear 32 will have a movement rotationally the same as the rotation of the shaft, the amount of which rotation will be:

$$\frac{N(34) - N(28)}{N(28)}$$

It will be observed by way of the number of teeth 34 being less than the number of teeth 28 rotation is negative, that is, opposite to the direction of rotation of gear 24 but in the same direction as shaft 10.

The net rotation of the system from shaft 10 to shaft 36 is the sum of the two equations referred to above.

From this it can be seen that the two sides of the angle gear 24 can have the same number of teeth. It will be observed that the illustration made provides for a gear ratio equal to:

$$\frac{1}{100} - \frac{1}{101} = .01 - .0099 = 0.0001$$

This represents a gear ratio of 10,000 to 1 in a single stage with only one high-speed part, the shaft 10 and its angular part 20. The gear 24 turns at slow speed. The speed of rotation of the point of contact between teeth 26 and 16 is equivalent to the speed rotation of shaft 10.

In FIG. 2 instead of having a single gear on an angle between the gear 14 and the gear 32 an assembly is provides which is in itself a reduction gear train as between one gear having teeth meshing with the teeth of the gear 14 and another gear having teeth meshing with the teeth of the gear 32. This assembly is designated generally at 60 in FIG. 2. The shaft 10 has a part 20 disposed at an angle as in the previous embodiment. Journaled on this angled part is a spider or carrier plate 62 having shafts or arbors 64, 66, and 68 normal to it. On the shaft or arbor 64 is a gear 70 having teeth 72 that mesh with the teeth 16 of gear 14. On a part of the shaft 64 is a smaller gear 76 that rotates with the gear 70. On the shaft 66 is a gear 80 that meshes with the gear 76 and on the shaft 66 also is a smaller gear 82. On the shaft 68 is the gear 86 which is a beveled gear having teeth 90 that mesh with the teeth 34 on gear 32.

In FIG. 2 it may be observed that gear 90 will rotate substantially slower than gear 70. Gear 70 being smaller than gear 14 and having fewer teeth will undergo negative rotation. Gear 90 may rotate in either the same direction as gear 90 or in the opposite direction. Gear 90 being smaller and having fewer teeth than gear 32 will impart rotation to gear 32 in a direction opposite to its own direction of rotation. So if gear 86 rotates in the same direction as gear 70, the rotation it imparts to gear 32 is positive, the net being the resultant of the rotations.

With high rates of rotation of the shaft 10 the inclined axial or shaft part 20 should be dynamically balanced with respect to the input shaft. Thus, flyweights can be added as shown 40 and 42 in FIG. 3. This does not relieve the centrifugal turning force on the gear that tends to disengage it from the mating gears. This can be circumvented only by rigid construction of the gear.

The fly weights can, of course, be used in a structure like that of FIG. 1. The structure of FIG. 3 is different in certain other respects. The nonrotatable gear 14 is similar. The gear 24 is similar; however, the shaft 10 has portion 50 that is normal to the axial portion and an angular portion 20' on which is journaled the gear 24. Gear 24 is now larger than gear 14 and gear 32 is larger than gear 24. This produces a stepped-down gear ratio wherein the output gear on shaft 36 turns in the same direction as the input shaft 10. It will be observed that the center of gear 24 is offset vertically from the axis of aligned shafts 10 and 36, and depending on this amount, gear 32 can be larger than gear 24. This makes it possible to achieve the desired relative sizes (i.e.) number of teeth as between pairs of gears.

It should be observed that in the gear trains as described there is no sliding friction such as in hypoid gears.

FIG. 4 shows a further modified form of the invention.

In this form of the invention shaft portion 20 is extended as shown at 130 and provided on it are two bevel gears 132 and 134 which are spaced apart, the gear 132 having teeth 134 that mesh with the teeth 16 and the gear 134 having teeth 136 that mesh with the teeth 34. The spacing between gears 132 and 134 is such that the center of gear 132 is below or offset one way from the axis of the aligned shafts 10 and 36 while the center of gear 134 is above or offset the other way from the axis of the aligned shafts 10 and 36. Thus, the configuration is such that gear 132 can be larger than gear 14, and therefore, have more teeth. Gear 134 is of the same size as gear 132 but is larger than the gear 32. Thus, the drive as between gears 14 and 132 is from a smaller to a larger gear and the drive as between gears 134 and 32 is from a larger to a smaller gear. The principles illustrated by the foregoing examples apply and thus, it will be observed that the relative ratios of teeth can be adjusted to provide for desired reductions in speed of the output gear 32. Gears 132 and 134 may be of different rather than the same size.

FIG. 5 shows another form of the invention wherein the same gear train is set up to provide for two output shafts, one rotating in one direction and one in the other. The shaft 10 has the angular part 20 on which is journaled gear wheel 140 which has a set of bevel teeth 142 on one side which mesh with the teeth 16 on the gear 14. On the shaft part 130 is another bevel gear 144 having teeth 146 meshing with teeth 150 of output gear 152 on tubular shaft 154, gear 152 having an offset hub part 156 to accommodate output gear 160 on shaft 162 which is telescoped inside of shaft 154. Gear 160 has teeth 164 meshing with teeth 166 on another gear 168 on axle 130. Gears 168 and 160 are smaller than gears 144 and 152. Gears 140, 144 and 168 are axially spaced so that the characteristics of the embodiment of FIG. 4 are realized with two output shafts.

In this form of the invention there are two output shafts 154 and 162 which are concentric, one being telescoped within the other and which can cooperate with clutch means so that either one or the other can be coupled, that is, clutched to a load. It may be observed in the structure of FIG. 5 that the ratio as between the numbers of teeth on the pairs of gears may be as in the examples set forth in detail in the foregoing. Thus, it may be observed that with the output gears 164 and 152 of different sizes the ratios of numbers of teeth can be readily adjusted so that one output gear rotates in one direction and one in the opposite direction for the same direction of rotation of the input shaft 10.

DETERMINATION OF GEAR RATIOS

The following data illustrates how a gear train can be designed to produce a desired gear ratio and to be within a specified dimensional configuration or design.

See FIG. 3 wherein the radii of the gears are designated $R_1$, $R_2$, $R_3$ and $R_4$. The offset of the center gear is $a$ and the angle of tilt of gear 24 is $b$.

It may be observed that (regardless of $b$) $R_4 = R_1 + 2a$ where $a$ is the offset of the angle gear center from the axis. Thus, all embodiments are variations of the same principal (i.e.) $R_4 = R_1 + 2a$, where $a$ may be + or −. Now resolving the ratio and direction of rotation, for one revolution of the shaft, $$R_2 \text{ moves } \frac{R_2 - R_1}{R_2} \text{ or } 1 - \frac{R_1}{R_2}$$

If $R_1 < R_2$, movement is positive or forward. For one revolution of the shaft, $R_4$ moves $$\frac{R_4 - R_3}{R_4} = 1 - \frac{R_3}{R_4}$$

If $R_3 < R_4$, movement it positive or forward. Adding the two motions, $$E = 1 - \frac{R_1}{R_2} + 1 - \frac{R_3}{R_4}$$

$$= 2 - \frac{R_1}{R_2} - \frac{R_3}{R_4}$$

$$= 2 - \left(\frac{R_1}{R_2} + \frac{R_3}{R_4}\right)$$

which is the input to output ratio in terms of radii. It can, of course, be similarly stated in terms of number of gear teeth on each gear.

For an opposite center offset,
$R_2 > R_1$ $R_4 > R_1$
$R_2 = R_3$
$R_1 < R_2 = R_3 < R_4$ The dimensions $a$ and $b$ can be varied independently and gear ratios readily calculated for large families of configurations of designs of gear trains, as follows:
Ratio of $R_1$ to $R_2 = (R_1 + a)/\cos b$
Ratio of $R_3$ to $R_4$:
  $R_3 = (R_4 - a)/\cos b$
Ratio of $R_1$ to $R_4$:

$$\frac{(R_1 + a)}{\cos b} = \frac{(R_4 - a)}{\cos b}$$

Solving the I–O (input to output) ratio:

$$I\text{-}O \text{ (ratio)} = 2 - \left(\frac{R_1}{R_2} + \frac{R_3}{R_4}\right)$$

$$= 2 - \left(\frac{R_1 \cos b}{R_1 + a}\right) + \left(\frac{R_4 - a}{R_4 \cos b}\right)$$

Ratios as so determined can readily be plotted on a graph or chart having dimension $a$, as abcissas, gear ratio as ordinates, and the angle $b$, appearing as a family of curves for cosines of the angle.

The same mathematical analysis is applicable to the "split gear" construction of FIG. 4, this configuration having the advantage of having the two gears 132 and 134 with their centers oppositely offset from the axis of the input and output shafts. It is also applicable to the gear train of FIG. 5.

From the foregoing those skilled in the art will understand the nature and construction of the invention and the manner in which it achieves and realizes all of the objects and advantages as set forth in the foregoing as well as the many additional advantages that are apparent from the detailed description.

The foregoing disclosure is representative of preferred forms of the invention and is to be interpreted in an illustrative rather than a limiting sense, the invention to be accorded the full scope of the claims appended hereto.

I claim:

1. A speed-changing device comprising: a member having a first fixed gear face; a member having a second gear face and having an axle on which the member is mounted; means mounting the axle comprising a rotatable shaft whereby the second gear face meshes with the said first gear face at a point of contact between these gear faces which point rotates as the shaft rotates, whereby a single rotation of said shaft causes rotation of said second gear face about its axis a fractional part of a revolution; and rotary output means to which the rotation of said second gear face is delivered, said second-mentioned member having a third gear face, said rotary output means comprising means having a fourth gear face meshing with said third gear face and a gear train carried by said second member between the second and third gear faces.

2. A device as in claim 1, wherein said gear train carried by said second member comprises a plurality of intermeshing gears mounted on axles parallel to said first axle.

3. A device as in claim 2, wherein the gear train carried by said second member is a reduction gear train such that the gear face on the rotary output means is driven at a reduced speed.